Aug. 31, 1948.    M. S. SCHNEIDER    2,448,157
PORTABLE FILTER
Filed Sept. 1, 1945
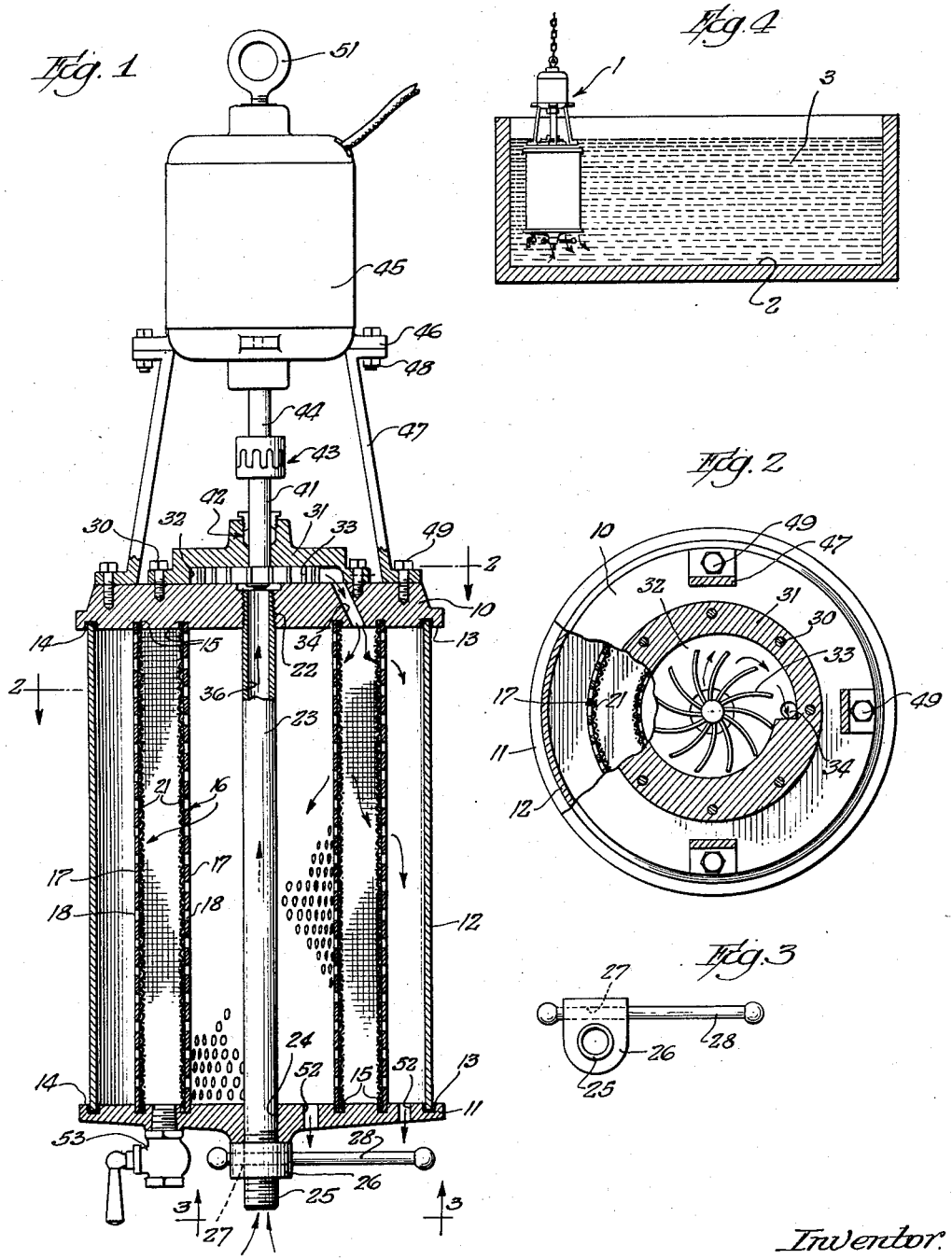
Inventor
Max S. Schneider
By Thiess, Olson & Mecklenburger
Attys Patented Aug. 31, 1948

2,448,157

UNITED STATES PATENT OFFICE 2,448,157

PORTABLE FILTER

Max S. Schneider, Chicago, Ill.

Application September 1, 1945, Serial No. 614,057

7 Claims. (Cl. 210—150)

My invention relates to a portable filter unit, and more particularly to one intended for use in connection with an open tank containing a fluid to be clarified, for example, an electroplating bath.

In processes of many kinds a tank of solution is used repeatedly, with the unavoidable result that a sediment or precipitate is formed in the solution. Such solids accumulate in greater part on the bottom of the tank, while much remains in suspension in the fluid. This condition is, in most instances, undesirable as the action of the solution is inhibited and the accumulation, if not removed, will eventually diminish the usable capacity of the tank.

To eliminate the sediment certain expedients have been followed, most of which are attended by practical shortcomings. One mode has been to drain the entire contents of the tank into a filter wherefrom the solution may be reclaimed for further use, thus necessitating several containers, accessory piping, and bothersome handling of the fluid. Meanwhile the tank is out of service. Scraping and flushing of the residue involve further delays.

Another method is to remove the precipitated solids by shoveling or scooping, with consequent interruption of the process and loss of valuable operating time. At best this method is far from thorough and the stirring up of the sediment merely returns a large proportion thereof into suspension.

My invention has for its principal object the provision of a filter unit adapted to be carried to a tank, for example one employed for an electroplating bath, and to be substantially immersed therein, the unit including a pump for drawing the liquid from the tank and forcing the same through filtering elements included therewith, whereupon the clarified liquid is returned to the tank.

Another object is the provision of a unit as aforesaid which comprises a minimum number of parts so arranged that the unit may be easily and rapidly disassembled for removal and cleansing of the filter pads.

A further object is to provide in a filter unit as aforesaid filter pads so arranged as to effect the filtering operation in a minimum of time.

Still another object is to provide filter pads for a filter unit of the type described which are quickly and cheaply renewable.

Another object is to provide a portable filter unit unencumbered by flexible pipes or hose for connecting the interior of the filter with the fluid to be filtered.

Other objects will become apparent as the description proceeds.

In carrying out my invention in one form I provide a filtering chamber having a casing serving as a side wall, a lower head and an upper head, the casing and the heads being adapted to enclose and support the filter pads. The pads are carried upon perforate shells and may be readily detached therefrom for washing or replacement. To unite the heads and casing I provide an axial bolt comprising a tube having a locking nut threadedly engaging one end thereof, the nut being manually rotatable by a handle. Formed unitarily with the upper head is a centrifugal pump driven by a motor supported on the upper head, and the motor includes an eye-bolt for supporting the entire unit for portability. Suitable openings in the heads permit fluid communication between the pump, the filtering chamber and the tank undergoing cleansing.

In the drawings:

Fig. 1 is a side elevational view of the device partially in cross section;

Fig. 2 is a cross sectional view taken on the line 2—2 of Fig. 1 and with certain parts broken away;

Fig. 3 is a view taken on the line 3—3 of Fig. 1; and

Fig. 4 is a somewhat schematic view in side elevation and section showing the device in its relation to a tank containing fluid.

Referring now to the drawing, the filter unit of my invention comprises a circular upper head 10 spaced apart as shown from a lower head 11. Disposed between the heads 10 and 11 is a cylindrical imperforate casing shell 12 adapted to be engaged in annular grooves 13 in the opposed faces of the heads 10 and 11. To insure against leakage of fluid there may be interposed between the shell 12 and the grooves 13 annular gaskets 14 of U-shaped cross section. Also fitted within grooves 15 concentric with the grooves 13 is the plurality of filter elements 16 comprising cylindrical perforate shells 17 having a plurality of apertures 18 therethrough. Over each of the shells 17 is stretched a sleeve of fabric 21, the fabric being slightly longer than the shells 17 and adapted to overlap each end thereof whereby when the shells are assembled between the heads 10 and 11 the fabric sleeves 21 may be held taut and effective. The fabric 21 is preferably made of spun glass woven, knitted or otherwise fabricated and of a mesh proportioned to the size of the solids to be encountered in filtering a particular solution. Glass fabric is to be preferred since it is not attacked by the more common acids and caustics.

Although the drawing indicates only two concentric filter elements 16 is will be understood from the description herein that a single element or a number greater than two may be employed, depending upon the kind of solids to be filtered and the degree of filtering to be effected.

Threadedly engaged in a correspondingly threaded aperture 22 of the head 10 is the tube 23 which passes easily but snugly through an unthreaded opening 24 in the head 11 and includes a threaded extremity 25. Adapted to threadedly engage the extremity 25 is the nut 26 of a contour most clearly shown in Fig. 3 and having a tangential aperture 27 through which the handle 28 is slidably movable.

Affixed by screws 30 to the upper head 10 is the pump casing part 31 enclosing within a cavity 32 thereof, the impeller 33. The cavity 32 is of the usual scroll form for a centrifugal type of pump and communicates at its wider end with a discharge port 34 passing through the head 10. Thus a liquid pump is constituted by the casing part 31 and the upper head 10 forming a pump cavity 32 therewithin and an impeller 33 rotatable within the cavity. Adjacent its center the impeller 33 is in fluid communication with the interior 36 of the tube 23. The head 11 has a plurality of openings 52 therethrough providing communication of the space within the inner element 16 and of the space intermediate the outer element 16 and shell 12 with the space exteriorly of the filter unit. The fluid passages of the filtering unit thus comprise an inlet 36 for the unfiltered fluid, the same constituting the inlet port of the pump, the cavity 32 of the pump, the outlet port 34 of the pump, the annular cylindrical space intermediate the inner filtering element 16 and the tube 23 as well as intermediate the outer filtering element 16 and the shell or casing 12, the outlets for the filtered fluid being shown at 52. Threadedly inserted in the head 11 is a cock 53 of any common type.

The impeller 33 is fixed to a shaft 41 passing through a stuffing box 42 of the usual construction, and at its outer end the shaft 41 is provided with one-half of a flexible coupling 43, the other half thereof being fixed to the shaft 44 of the electric motor 45. The lower housing of the motor 45 is provided with a plurality of ears 46 fastened to legs 47 by bolts 48, the lower end of each leg 47 being secured to the head 10 by screws 49. The upper housing of the motor 45 has affixed thereto an eye bolt 51. It is to be noted from Fig. 1 that the pump is positioned adjacent the upper head 10 and that the connection with the motor 45 is of minimum length. By close coupling of the pump and motor in the manner shown and described the filtering unit may be immersed in a body of fluid, and the pump thus submerged for self-priming without danger of the liquid coming into contact with the electric motor.

In Fig. 4 the filter unit indicated generally by the reference numeral 1 is shown in operative relation with a plating tank 2 containing a body of plating electrolyte 3. In order to transport the unit 1 from place to place and to raise and lower the same with respect to the tank 2 it may be suspended from a trolley or movable crane carrying a block and tackle.

Assuming that the filter unit 1 is in the position shown in Fig. 4 ready for the filtering operation, the motor 45 may be started by a suitable switch (not shown) and fluid from the tank will be pumped in the direction of the arrows indicated at the bottom of Fig. 1 through the interior 36 of the tube 23 into the impeller 33, and discharged through the port 34 into the space intermediate the filter elements 16. The fluid is then forced through the filter sleeves 21, and the now-clarified fluid is delivered to the hollow cylindrical spaces within the inner filter element 16 and intermediate the outer element 16 and casing 12 from which it is discharged through the openings 52 and returned to the body of fluid 3. The operation may be continued until all of the body of fluid 3 is properly filtered and, if necessary to insure thorough action it is obvious that unit 1 may be moved from zone to zone within the tank by means of the trolley or crane from which it is suspended. If desired a rubber hose may be fitted over the extremity 25 of the tube 23 whereby corners and other places difficult of access may be reached. Additionally the fluid may be stirred to agitate sediment on the bottom of the tank into suspension for passage through the filter.

The filtering unit of the invention is intended to be submerged in the fluid to be filtered to a depth which will bring the liquid level over the pump. Since such immersion of the unit will fill all of the various ports and chambers of the same with fluid, no priming of the pump is required. Prior devices intended for a similar use suffer from the shortcoming of liquid pumps generally in that a separate priming operation was dictated.

It will be understood that while the filtering operation proceeds it will not be necessary to disturb the plating operation being conducted within the bath 3. Ordinary plating apparatus provides that the racks upon which the articles to be plated are supported may be moved readily upon the bus bar and that the bus bars may be shifted with respect to the tank. Thus it is a simple matter to shift the racks and bus bars to allow clearance for immersion of the unit 1 in the body of fluid 3 as shown.

If it is desired to inhibit wasteful deposition of the plating metal on the filter unit 1 those portions thereof in contact with the electrolyte may be given a coating of rubbery material, as is well known in the art.

After the filter pads 21 are sufficiently encrusted with solids they may be removed for cleansing. This is accomplished after the unit 1 is removed from the tank by rotating the handle 28 and nut 26 to remove it from the member 23. The lower head 11 may then be slipped off the member 23 and the filter elements 16 removed. They are then easily replaced, the head 11 being resecured by the nut 26.

Before cleaning the filter it is desirable to drain therefrom any fluid entrapped between the elements 16 and which cannot escape through the apertures 52. For that purpose I have provided the cock 53 operable in an obvious manner. Because the handle 28 is slidable within the nut 26 it may be alternately rotated and reciprocated with respect to the opening 27 in order to clear the cock 53.

It will be apprehended that the invention is not limited to the use of filter elements 16 comprising a perforate shell and a fabric filter pad supported thereby, but that I may employ filter units of other types adapted to be easily removed from or replaced within the casing 12. Additionally, it will be understood that the invention is not limited to the use of a pair of filtering elements 16 but that more than one set may be embodied in concentric relation. In such event, the pump discharge port 34 will be branched to deliver unfiltered liquid intermediate each pair of filter units and the outlet faces of the filtering units would similarly be in fluid communication with additional discharge ports 52.

Moreover the invention is not intended to be limited to a unit including a centrifugal type of pump as shown and described but that a pump of any other known construction may be used, for example, a gear or other positive displacement type. Moreover, the motor 45 may be integral with the pump unit for simplification of construction and greater ease in maintenance. One important feature of the invention resides in the novel arrangement whereby unfiltered fluid discharged from the pump passes through two sets of filtering elements simultaneously. That is to say, the filtering operation is done in parallel rather than in series as is the case in prior art devices.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A portable liquid filtering unit adapted to be suspended from a carrier comprising in combination a pair of heads and a casing retained by and between said heads, a plurality of filter elements disposed within said casing, each of said heads having a centrally positioned aperture, a centrally disposed tubular member passing through said apertures, means including said member for detachably securing said heads and casing in operative relation, a pump supported on one of said heads and having a suction port and a discharge port, said member providing a passage for the liquid to be filtered to said suction port, and the said one head having a second aperture interconnecting the said discharge port with that zone of the interior of the casing adjacent one side of said elements, the other of said heads having an aperture for discharge of filtered fluid from the unit after the fluid has passed through said elements, means for driving said pump and means for suspending the unit from the carrier.

2. A portable liquid filtering unit adapted to be suspended from a carrier comprising in combination a casing, a head at either end of said casing and forming therewith a closed chamber, a plurality of filter elements disposed within said chamber, a pump associated with said chamber and having a suction port and a discharge port, a tubular member intermediate said heads, means coacting with said member for detachably securing said casing and heads in operative relation, said member providing a passage for the liquid to be filtered to said suction port, and said discharge port opening to within said chamber and communicating with that zone of said chamber adjacent one side of said elements, at least one of said heads having an opening for discharge of filtered fluid from said chamber after the fluid has passed through said elements, means for driving said pump, and means for suspending the unit from the carrier.

3. A liquid filter comprising in combination a casing, a head at either end of said casing and forming therewith a closed chamber, a filter element disposed within said chamber, a tubular member intermediate said heads, means associated with said member for detachably securing said heads and casing together, a pump having a suction port and a discharge port, said member providing a passage for the liquid to be filtered to said suction port and said discharge port opening to within the chamber and communicating with that zone of said chamber adjacent one side of said elements, at least one of said heads having an opening for discharge of filtered fluid from said chamber after the fluid has passed through said elements, and means for driving said pump.

4. A portable liuqid filtering unit comprising in combination a casing, an upper head and a lower head for said casing, each said head having a centrally positioned aperture, a tubular member in fluid communication with the aperture of said upper head and said member passing through the aperture of the other said head, means coacting with said member and the other said head to detachably secure said heads, casing and member together, a filtering element within said casing, a pump having a suction port and a discharge port, said suction port being in fluid communication with the bore of said member and said discharge port being in fluid communication with the interior of said casing and with that zone of said interior adjacent one side of said element, at least one of said heads having a plurality of apertures for discharge of clarified fluid from said casing after the fluid has passed through said element, and means for supporting the unit for movement from place to place.

5. A liquid filtering unit comprising in combination an upper head and a lower head, an imperforate shell intermediate said heads, said heads and shell defining a filtering chamber adapted to be immersed in a body of liquid, a plurality of filter elements within said chamber, each said element including a perforate member and a meshed member supported thereby, a pump carried on said upper head and having a suction port and a discharge port, an intake conduit for said pump, the other of said heads having an aperture therethrough, said conduit extending from said suction port and extending through said aperture and terminating in a threaded extremity, and threaded means engaging said extremity to detachably secure said heads, casing and elements in operative relation, and a motor for driving said pump supported on said upper head and positioned above said pump.

6. A liquid filtering unit comprising in combination an upper head and a lower head, an imperforate shell intermediate said heads, said heads and shell defining a filtering chamber adapted to be immersed in a body of liquid, a plurality of filter elements within said chamber, a pump carried on said upper head and having a suction port and a discharge port, an intake conduit for said pump, the other of said heads having an aperture therethrough, said conduit extending from said suction port and extending through said aperture and terminating in a threaded extremity, and threaded means engaging said extremity to detachably secure said heads, casing and elements in operative relation, and a motor for driving said pump supported on said upper head and positioned above said pump.

7. A liquid filtering unit comprising in combination an upper supporting member and a lower supporting member, an imperforate shell intermediate and supported by said members, at least one pair of parallelly disposed perforate filtering elements enclosed within said shell, a liquid pump supported on one of said members and means for driving said pump, a port for inlet of fluid to said pump and a port for discharge of fluid therefrom, said last mentioned port being in fluid communication with the space intermediate said pair of filtering elements, and one of said members having outlet ports for discharge of the filtered fluid, said discharge ports being positioned in fluid communication with the outlet faces of said filtering elements.

MAX S. SCHNEIDER.

REFERENCES CITED

The following references are of record in the file of this patent:

UNITED STATES PATENTS

| Number | Name | Date |
| --- | --- | --- |
| 796,519 | Kneuper | Aug. 8, 1905 |
| 1,148,237 | Kneuper | July 27, 1915 |
| 1,652,423 | Belke | Dec. 13, 1927 |
| 2,325,169 | Alsop | July 27, 1943 |